Aug. 19, 1969  F. M. MINKS  3,462,644
TRIGGERED IGNITION SYSTEM
Original Filed Oct. 4, 1965
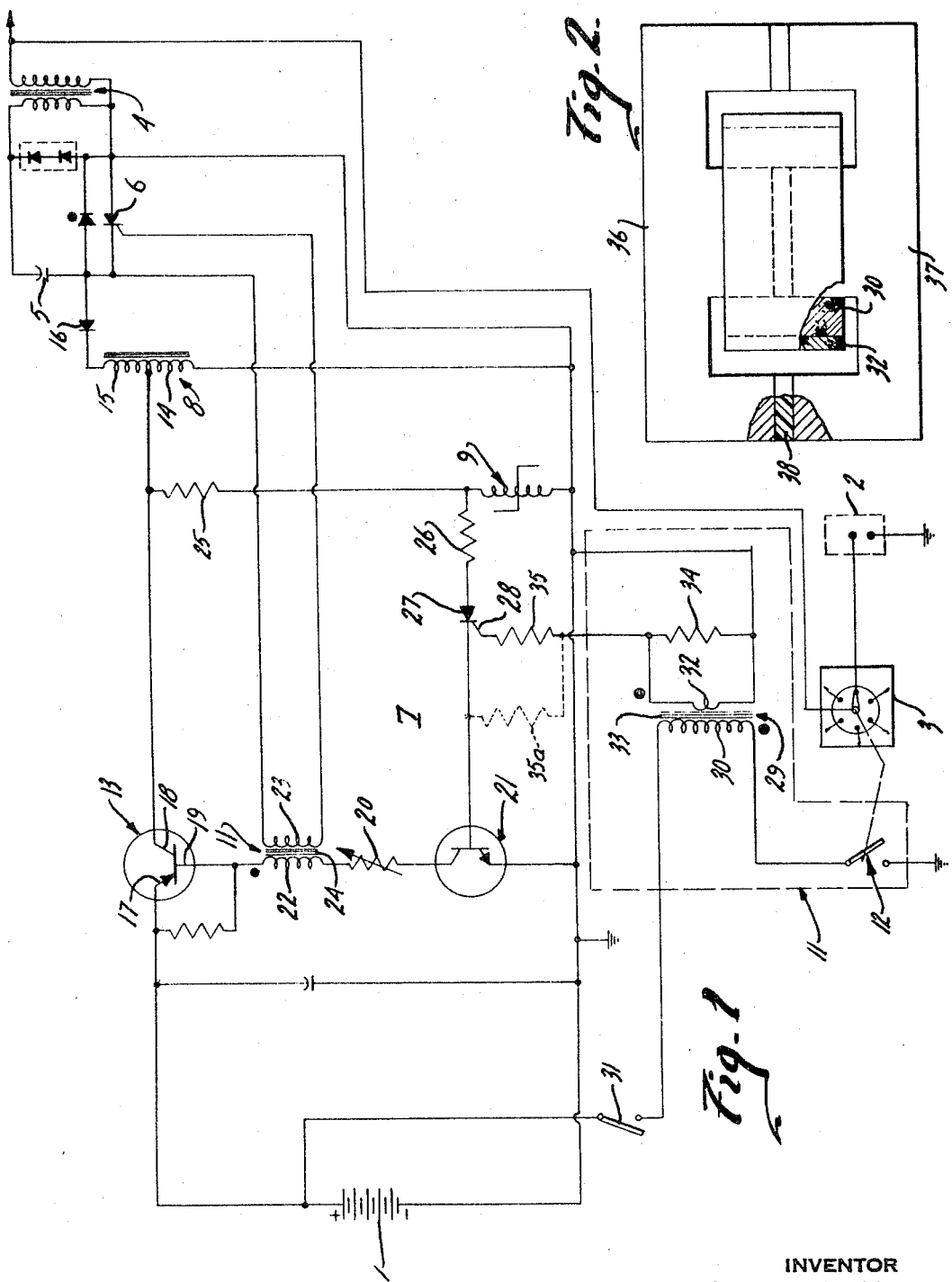
INVENTOR
FLOYD M. MINKS
BY
Andrus & Starke
Attorneys United States Patent Office 3,462,644
Patented Aug. 19, 1969

3,462,644
TRIGGERED IGNITION SYSTEM
Floyd M. Minks, Port Washington, Wis., assignor, by mesne assignments, to Brunswick Corporation, Chicago, Ill., a corporation of Delaware
Continuation of application Ser. No. 492,571, Oct. 4, 1965. This application Mar. 29, 1968, Ser. No. 717,460
Int. Cl. H05b 41/36
U.S. Cl. 315—209                            7 Claims

ABSTRACT OF THE DISCLOSURE

A capacitor discharge ignition system includes a blocking oscillator having output elements of a main charging transistor connected in series with a battery and the charging winding of an inductor. The output of the inductor is connected in series with a diode to charge a capacitor which is connected to the spark plugs in series with a main silicon controlled rectifier. During the time the transistor conducts, energy is stored in the inductor. When the transistor turns off, the collapsing field in the inductor results in transfer of the stored energy to the capacitor. The transistor is controlled by an input and feedback network including a control transistor and a silicon controlled rectifier connected in the base circuit of the charging transistor. The triggering of the silicon controlled rectifier is through a switch driven in synchronism with the engine. The main controlled rectifier is triggered from a pulse transformer having its primary winding series connected in the base of the charging transistor and the secondary winding connected across the gate to cathode circuit of the controlled rectifier.

---

This application is a continuation of applicant's earlier copending application entitled Triggered Ignition System which was filed Oct. 4, 1965 with Ser. No. 492,571.

This invention relates to a triggered ignition system or the like and particularly to a triggered capacitor discharge system for internal-combustion engines and the like and particularly to the formation of a discharge control pulse.

Electronic ignition systems for internal-combustion engines have been suggested for a number of years wherein a capacitor is charged from the battery and/or the generator and is rapidly discharged through the induction coil of the usual ignition unit to fire a spark plug. The recent development of solid state devices such as transistors, silicon controlled rectifiers and the like provided a highly satisfactory amplifying and switching means for controlled charging and switching of the capacitor circuit. A highly satisfactory capacitor discharge ignition system is shown in applicant's copending application entitled Controlled Electrical Pulse Source which was filed on Oct. 4, 1965 with Ser. No. 492,571 and is assigned to a common assignee.

In the above application, a triggered blocking oscillator is provided having a control circuit connected in the feedback circuit to determine the time that each pulse begins and the energy per pulse. In a preferred construction, a transistor is connected in series with the primary of an oscillator transformer to a battery. The transformer is connected to charge a capacitor which is subsequently discharged through the spark gap by triggering or firing of a controlled rectifier. The rectifier is fired from a winding wound on the charging transformer. A triggering and feedback circuit employs a control transistor connected in the base circuit of the main or charging transistor with the input of the control transistor connected in circuit through a controlled rectifier. The gate of the latter controlled rectifier and the base of the control transistor are connected to a suitable signal source which in turn is controlled in accordance with the timing of the internal-combustion engine to provide periodic turn-on pulses to the controlled rectifier. A square loop core unit acts as a volt-time sensitive switch to divert current from the silicon controlled rectifier and the input of the control transistor to turn off the oscillator. The conduction is thus initiated by the turn-on pulse and terminated by an energy regulator.

The present invention is particularly directed to the improvement in the triggering means for the capacitor discharging controlled rectifier. In accordance with the present invention, a separate pulse transformer is provided. The primary winding is serially connected in circuit with the input element of the main charging transistor. The secondary winding is connected to the gate or trigger means of the controlled rectifier.

The placement of a separate pulse transformer in the base or input loop of the charging transistor has been found to provide a simple and highly reliable means for triggering the rectifier at the very beginning of the main inductor charging cycle.

The drawing furnished herewith illustrates a preferred construction of the present invention in which the above advantages and features are clearly disclosed as well as others which will be clear from the following description of the drawing.

In the drawing:

FIG. 1 is a schematic circuit diagram of an ignition system construction in accordance with the present invention; and FIG. 2 is a diagrammatic view of a trigger inductor shown in FIG. 1.

Referring to the drawing and particularly FIG. 1, the illustrated ignition system is connected to a direct current source such as a low voltage battery 1 having a suitable rated output voltage such as 6, 12 or 24 volts all of which are presently employed in automobiles, trucks, outboard motors or other similar internal-combustion engines. A single spark gap 2 is illustrated forming a part of a combustion chamber of the prime mover. In multicylinder engines, a plurality of spark gaps will normally be employed with a distributor 3, shown in block diagram, provided to sequentially distribute the power to the several gaps in accordance with known practice. A main firing transformer 4 couples the spark gap 2 to a capacitor discharge circuit including a storage capacitor 5 connected to be discharged through the transformer 4 in series with a silicon controlled rectifier 6.

The capacitor 5 is connected to be charged from the battery 1 through a triggered blocking oscillator 7 which includes a charging transformer or inductance unit 8 and a square loop core unit 9 to regulate the energy per capacitor charging pulse.

A pulse transformer 10 is connected in the circuit of blocking oscillator 7 and to the controlled rectifier 6 to fire the rectifier in timed relation to the operation of the internal-combustion engine and the distributor 3 as hereinafter described and thereby causes proper transfer of energy from the capacitor 5 to gap 2.

The illustrated ignition system generally corresponds to that of the previously identified application with the exception of the pulse transformer 10 and its connection in the oscillator circuit as well as a novel trigger circuit 11 for the oscillator 7. Consequently, the ignition system is generally only briefly described in sufficient detail to clearly explain the operation of the present invention.

An input switch 12 which may be the usual points employed with internal-combustion engines is coupled to be mechanically actuated in synchronism with the operation of the engine, diagrammatically shown coupled to the operation of the distributor 3, to provide periodic triggering of the blocking oscillator 7 into conduction.

The osuillator 7 generally includes a charging transistor 13 connected in series with a primary 14 of the transfer or oscillating transformer 8, shown as an autotransformer. A secondary 15 of transformer 8 is connected in a charging circuit with the capacitor 5 and a charging diode 16. The circiut is such that during the conduction through the primary 14 from the battery 1, the diode 16 opens the circuit of capacitor 5. When the current through the transformer primary 14 is cut off, a pulse is generated in the secondary 15 which charges the capacitor 5, as described in the perviously referred to application. This charge is transmitted to the gap 2 as noted above, at the next initiation of conduction of the oscillator 7.

Generally, the circuit operation includes closing of switch 12 to charge the trigger circuit 11. When switch 12 opens, the trigger circuit 11 initiates operation of the oscillator 7 which derives power from the battery 1 with a portion of the current passing through the square loop core unit 9. The turn-on current energizes the transformer 10 to fire controlled rectifier 6 and discharge the previous charge on capacitor 5. When the square loop core unit 9 is saturated, it will rapidly turn off the oscillator 7. The collapsing field in transformer 8 produces a current in the secondary 15 which charges capacitor 5 to a corresponding level. When the switch 12 again opens to initate the conduction of oscillator 7, pulse transformer 10 is again energized and the silicon controlled rectifier 6 is fired to discharge the capacitor 5. The capacitor 5 is therefore charged and discharged in timed relation to the operation of the distributor 3 and the movement of the piston, not shown, to provide proper transfer of energy pulses from the capacitor 5 through the pulse transformer 4 to the gap 2.

More particularly in the illustrated embodiment of the invention, the oscillator circuit includes the transistor 13 shown as a PNP type, connected in a common emitter configuration; having an emitter 17 connected to the positive side of the battery 1 and a collector 18 connected to the one side of the primary winding 14. The opposite side of the winding 14 is connected to the negative side of the battery 1 through a common ground connection. The transistor 13 includes a base 19 as an input means or element which is connected to derive its power from the battery 1 as follows.

The base 19 is connected to the negative terminal of the battery 1 through the pulse transformer 10, a current limiting resistor 20 which desirably has a resistance value which increases with increasing current flow through it and a transistor 21 to ground.

The pulse transformer 10 is a relatively compact and small unit having a primary winding 22 connected in series with the base 19 and having a secondary winding 23 connected to the gate of the silicon controlled rectifier 6. The secondary winding 23 is close coupled to the primary winding 22 by a suitable core 24 preferably a small ferrite core. The transformer acts as a current transformer having the property or characteristic of being saturated in a time small compared with the time required to store the required energy in transformer 8. As a result, the initial oscillator turn-on current in the base loop of the transistor 13 in passing through primary winding 22 generates a pulse in the secondary winding 23. The pulse terminates on saturation of the core 24.

The resistor 20 has a sharply changing resistance with current passing through it. This is a result of a high positive temperature coefficient of the resistance element coupled with a controlled thermal impedance from the resistance element to its surroundings.

The control transistor 21 is shown as an NPN type having the collector to emitter circuit in the above base circuit and a base to emitter circuit connected between the collecor 18 of transistor 13 and the ground in a control circuit branch to derive power from the collector 18 of transistor 13 after initiation of the triggering of the blocking oscillator 7. The connection to the collector 18 is through resistors 25 and resistor 26 and a silicon controlled rectifier 27 to provide a selectively completed or triggered voltage dividing network.

The silicon controlled rectifier 27 includes a gate 28 which controls conduction through the rectifier and the control circuit branch.

The gate 28 is connected to the battery 1 through the current limiting resistor 35 and a novel trigger circuit 11 including a pulse transformer 29, resistor 34 and switch 12, as follows.

Switch 12 is connected to the positive side of battery 1 in series with the primary winding 30 of the pulse transformer 29 and an on-off control switch 31. The opposite side of the switch 12 is connected to the negative side of the battery 1 through a ground connection.

The pulse transformer 29 includes a secondary winding 32 magnetically coupled to the primary winding 30 by a core unit 33 and wound to produce the indicated polarities.

The secondary winding 32 is connected in parallel with a resistor 34 between ground and a current limiting resistor 35 which is connected to the gate 28 of the silicon controlled rectifier 27. The paralleled resistor 34 serves to critically damp the distributed capacity associated with windings 30 and 32.

When points or switch 12 close, current flows through the primary 30 and the switch 12 with energy being stored in the core 33. The time constant of the circuit is selected to be substantially greater than the mechanical contact source associated with mechanically actuated point units such that the output energy associated with the contact bounce is insufficient to fire the rectifier 27. For example, whereas contact bounce may occur about 0.5 milliseconds after closing, the circuit can be readily constructed with a time constant of 2 milliseconds. When the points or switch 12 open, the primary 30 acts as a high voltage, low current source impressed across the points or switch 12. This produces an arc across the points and produces an output trigger voltage insensitive to engine speed and battery voltage.

The triggering circuit therefore provides a particularly simple and inexpensive system which can employ well known and readily available ignition point units.

The pulse transformer preferably is constructed in accordance with the construction of FIG. 2 wherein the core unit 29 includes a pair of E-shaped ferrite cores 36 and 37 mounted with the ends of the legs adjacent each other to define a three-legged core unit. The legs are separated slightly by nonmagnetic spacers 38 to define a small air gap in the magnetic circuits through the several legs. The primary winding 30 and the secondary winding 32 are wound about the central leg.

Briefly, in operation, closing switch 12 charges the pulse transformer 29. Opening of switch 12 reverses the polarities of the windings of transformer 29 to generate a firing pulse to the silicon controlled rectifier 27 of the oscillator 7.

The silicon controlled rectifier 27 and transistor 21 are biased to conduct and provide an input bias on the transistor 13. Regenerative action to the transistor 21 causes it to conduct at a greater rate. The current will thus increase through the transistors 13 and 21.

The increasing current in the base circuit of the main charging transistor 13 generates a sharp pulse signal in the pulse transformer 10 which is applied to the controlled rectifier 6 through the secondary winding 23. The fired controlled rectifier 6 provides a completed circuit between the capacitor 5 and the transformer 4 and the capacitor 5 discharges to produce a firing pulse at the spark gap 2.

When transistor 13 conducts, the current primarily flows through the transformer 8 with energy stored in the core. A part of the current is diverted through the resistor 25. The square loop core unit 9 provides a relatively high impedance to the current flow until it reaches saturation. Thus, current flows through resistor 26, rectifier 27 and transistor 21. When unit 9 changes to the saturated condition, the reactance reduces substantially and essentially to zero and provides a direct bypass circuit of the transistor 21. The silicon controlled rectifier 27 and the transistor 21 stop conducting and the bias on the base 19 of the transistor 13 is removed to turn off the oscillator 7.

When the core unit 9 terminates conduction, the magnetic field in the core of the transformer 8 collapses and induces a voltage of opposite polarity in the secondary winding 15 to cause a current flow through the capacitor charging circuit which includes a blocking diode 16 and related elements as described in the previously identified copending application. The capacitor 5 is charged to the selected value determined by the cutoff of the oscillator 7 through the action of the core unit 9.

The charged capacitor 5 is subsequently discharged through transformer 4 to fire the spark gap 2 by triggering of the silicon controlled rectifier 6 during the subsequent initial conduction of the next cycle of the oscillator 7.

The operation of the illustrated embodiment of the invention may be briefly summarized as follows.

The points or switch 12 is coupled to the distributor 3 to be driven in accordance with the movement of the pistons of the internal-combustion engine in accordance with any suitable or known system. The battery 1 provides a source of energy to the oscillator 7 which transfers energy to the capacitor 5 to charge it to a selected level. When the switch 12 is opened, it initiates conduction through the gate circuit of silicon controlled rectifier 27 and the input or base loop of transistor 21. The transistors 11 and 21 then conduct. Conduction in the base loop of transistor 21 generates a pulse in the pulse transformer 10 which is connected to fire the controlled rectifier 6 and thereby discharge the charge placed on the capacitor 5 during the previous cycle of oscillator 7. Conduction in the output loop of transistor 13 provides a charging current to transformer 8 until the square loop core unit 9 is saturated at which time it rapidly turns the oscillator off, terminating the charging of the transformer 8 and the transferring of a new charging pulse to the capacitor 5.

The next time the switch 12 is closed, energy begins to be stored in the transformer 29 and preparing the system for recycling in accordance with the above description. The capacitor 5 is therefore sequentially charged and discharged to fire the proper spark gap 2 or gaps in proper sequence in accordance with the operation of the engine.

The use of a separate pulse transformer 10 in the position shown produces the short duration, high amplitude pulse which is desirable to turn on rectifier 6. Because of the transformer location, undesired firing pulses cannot be produced by the distributed capacity associated with transformer 8, such as may occur if the firing voltage is taken from transformer 8. The distributed capacity is not a problem with transformer 10 because of its small size and relatively few turns. In a practical ignition system similar to that of FIG. 1, transformer 10 is saturated approximately 10 microseconds after the initiation of current flow. A pulse from transformer 8 was approximately 100 times as long or one millisecond. The core of the transformer was approximately a quarter inch cube having a cross-sectional leg area of .02 square inch. The windings 22 and 23 were each 10 turns and were wound on opposite halves of the core. The core was formed of a high resistivity material so that the windings did not have to be insulated from the core.

If a greater excitation of the transistor 21 is desired, a resistor 35A, shown in phantom, may be connected between the base of transistor 21 and the gate resistor 35, as shown.

The present invention provides an improved triggering of the controlled rectifier in the capacitor discharge circuit with the pulse transformer isolated from the output circuit. The system has been found to provide a highly reliable means for triggering the discharge during the initial portion of the charging cycle.

Various modes of carrying out the invention are contemplated as being within the scope of the following claims particularly pointing out and distinctly claiming the subject matter which is regarded as the invention.

I claim:

1. In an ignition system for an internal-combustion engine and having a first storage means connected to a firing means by a triggered switch means and a blocking oscillator having a magnetic storage means and a charging transistor having input elements connected in an oscillator circuit including a feedback circuit connecting a portion of the output of the oscillator to the input of said transistor and connected to transfer the energy and charge the first storage means, said oscillator having the charging transistor connected to control conduction for charging of the magnetic energy storage means during transistor conduction and having means to initiate and terminate conduction through the transistor, the improvement comprising a separate pulse transformer having an input winding connected in series with an input element of the transistor in said oscillator circuit and having an output winding connected to the triggered switch means, said pulse transformer generating a trigger pulse in response to initiation of conduction of the transistor.

2. The ignition system of claim 1 wherein said transformer includes a square loop core which has the characteristic of being rapidly saturated by the transistor current.

3. The ignition system of claim 1 wherein said transistor is connected in a common emitter circuit connection having a base bias loop and said input winding is connected in series with the base of the transistor in said base bias loop and energized by the base current.

4. In a capacitor discharge ignition system for an internal-combustion engine,
a capacitor,
a triggered switch means connected in a discharge circuit with the capacitor,
a blocking oscillator having a magnetic energy storage means connected to charge the capacitor and having a charging transistor connected to control conduction and including a feedback network connecting a portion of the output power of the oscillator to said charging transistor and having means connected to bias said transistor on and thereby initiate conduction in the oscillator, and
a pulse transformer having an input winding connected in series with an input element of the transistor and having an output winding connected to the triggered switch means, said pulse transformer generating a trigger pulse in response to initiation of conduction of the blocking oscillator.

5. A capacitor discharge ignition system for an internal-combustion engine,
a capacitor,
a triggered switch means connected in a discharge circuit with the capacitor,
a blocking oscillator having a charging transistor connected in common emitter circuit connection with a magnetic energy storage means and having an output circuit in series with the capacitor to charge the capacitor and having a base loop to control the transistor, and
a pulse transformer having a primary winding connected in series with the base in said base loop and a secondary winding connected to the triggered switch means, said pulse transformer generating a trigger pulse in response to the establishment of base loop current.

6. In a pulse controlled system,
a blocking oscillator having a charging transistor connected in common emitter circuit connection with a magnetic energy storage means and having an output circuit in series with a capacitive energy storage means and having a base loop to control the conduction through the transistor,
a triggered switch means connected in a series discharge circuit with said capacitive energy storage means, and
a pulse transformer having a primary winding connected in series with the base in said base loop and a secondary winding connected to the triggered switch means to fire said triggered switch means, said pulse transformer generating a trigger in response to the base loop current.

7. In the pulse controlled system of claim 6, a control transistor having an output circuit connected in series in said base loop with the primary winding and direct current input connection means.

References Cited

UNITED STATES PATENTS 3,312,211  4/1967  Boyer _____ 315—209

JAMES D. KALLAM, Primary Examiner

JERRY D. CRAIG, Assistant Examiner

U.S. Cl. X.R.

123—148; 307—282; 315—219

PO-1050
(5/69)

UNITED STATES PATENT OFFICE
CERTIFICATE OF CORRECTION

Patent No. 3,462,644            Dated August 19, 1969

Inventor(s) FLOYD M. MINKS

It is certified that error appears in the above-identified patent and that said Letters Patent are hereby corrected as shown below:

Column 4, line 35, delete "0.5" and substitute --.05--

SIGNED AND
SEALED
MAY 12 1970

(SEAL)
Attest:

Edward M. Fletcher, Jr.
Attesting Officer

WILLIAM E. SCHUYLER, JR.
Commissioner of Patents